United States Patent
Palley (10) Patent No.: US 7,601,416 B2
(45) Date of Patent: Oct. 13, 2009

(54) FRAGMENT AND STAB RESISTANT FLEXIBLE MATERIAL WITH REDUCED TRAUMA EFFECT

(75) Inventor: Igor Palley, Madison, NJ (US)

(73) Assignee: Honeywell International Inc., Morristown, NJ (US)

( * ) Notice: Subject to any disclaimer, the term of this patent is extended or adjusted under 35 U.S.C. 154(b) by 206 days.

(21) Appl. No.: 11/295,042

(22) Filed: Dec. 6, 2005

(65) Prior Publication Data

US 2008/0119099 A1    May 22, 2008

(51) Int. Cl.
- B32B 3/30 (2006.01)
- B32B 5/14 (2006.01)
- B32B 27/12 (2006.01)
- F41H 5/02 (2006.01)
- F41H 5/06 (2006.01)

(52) U.S. Cl. .......... 428/171; 428/156; 428/170; 428/172; 428/911; 428/912; 442/134; 442/135; 442/164; 442/169

(58) Field of Classification Search ............ 428/911, 428/912; 442/134, 135
See application file for complete search history.

(56) References Cited

U.S. PATENT DOCUMENTS

| | | | |
|---|---|---|---|
| 2,640,987 A | 6/1953 | Ehlers | |
| 2,789,076 A | 4/1957 | Frieder et al. | |
| 3,398,406 A * | 8/1968 | Waterbury | 2/2.5 |
| 3,671,542 A | 6/1972 | Kwolek et al. | 524/157 |
| 3,975,487 A | 8/1976 | Cottis et al. | 264/210.6 |
| 4,118,372 A | 10/1978 | Schaefen | 528/190 |
| 4,137,394 A | 1/1979 | Meihuizen et al. | 528/100 |
| 4,161,470 A | 7/1979 | Calundann | 524/599 |
| 4,356,138 A | 10/1982 | Kavesh et al. | 264/164 |
| 4,403,012 A | 9/1983 | Harpell et al. | 428/290 |
| 4,413,110 A | 11/1983 | Kavesh et al. | 526/348.1 |
| 4,440,711 A | 4/1984 | Kwon et al. | 264/185 |
| 4,457,985 A | 7/1984 | Harpell et al. | 428/224 |
| 4,501,856 A | 2/1985 | Harpell et al. | 525/423 |
| 4,535,027 A | 8/1985 | Kobashi et al. | 428/364 |
| 4,543,286 A | 9/1985 | Harpell et al. | 428/288 |
| 4,563,392 A | 1/1986 | Harpell et al. | 428/394 |
| 4,584,347 A | 4/1986 | Harpell et al. | 525/119 |
| 4,599,267 A | 7/1986 | Kwon et al. | 428/364 |
| 4,613,535 A | 9/1986 | Harpell et al. | 428/113 |
| 4,623,574 A | 11/1986 | Harpell et al. | 428/113 |
| 4,650,710 A | 3/1987 | Harpell et al. | 428/263 |

(Continued)

FOREIGN PATENT DOCUMENTS

WO    WO9006387    6/1990

(Continued)

Primary Examiner—Jennifer A Chriss
(74) Attorney, Agent, or Firm—Erika S. Wilson (57) ABSTRACT

Flexible composites which are ballistic and stab resistant. The composites are formed from at least one, and preferably a plurality of, fibrous layer comprising a network of high tenacity fibers. A stack of a plurality of fibrous layers is consolidated in a desired pattern over a substantial portion of its surface area which results in areas which are consolidated and areas that are unconsolidated. The unconsolidated areas provide flexibility to the overall composite structure and the structure is resistant to ballistic projectiles and/or sharp objects. Body armor formed from the composites is comfortable to wear and reduces the degree of trauma to the wearer as a result of impact by the ballistic projectile or sharp object.

35 Claims, 1 Drawing Sheet

U.S. PATENT DOCUMENTS

| | | | |
|---|---|---|---|
| 4,681,792 A | 7/1987 | Harpell et al. | 428/102 |
| 4,737,401 A | 4/1988 | Harpell et al. | 428/252 |
| 4,737,402 A | 4/1988 | Harpell et al. | 442/187 |
| 4,748,064 A | 5/1988 | Harpell et al. | 428/113 |
| 4,820,568 A | 4/1989 | Harpell et al. | 428/113 |
| 4,883,700 A | 11/1989 | Harpell et al. | 428/113 |
| 4,916,000 A | 4/1990 | Li et al. | 428/105 |
| 4,953,234 A | 9/1990 | Li et al. | 2/412 |
| 5,006,390 A | 4/1991 | Kavesh et al. | 428/105 |
| 5,061,545 A | 10/1991 | Li et al. | 428/195 |
| 5,112,667 A | 5/1992 | Li et al. | 428/113 |
| 5,124,195 A | 6/1992 | Harpell et al. | 428/152 |
| 5,165,989 A | 11/1992 | Bhatnagar et al. | 428/245 |
| 5,167,876 A | 12/1992 | Lem et al. | 252/602 |
| 5,175,040 A | 12/1992 | Harpell et al. | 428/113 |
| 5,185,195 A | 2/1993 | Harpell et al. | 428/102 |
| 5,187,023 A | 2/1993 | Prevorsek et al. | 442/228 |
| 5,190,802 A | 3/1993 | Pilato | 428/111 |
| 5,196,252 A | 3/1993 | Harpell et al. | 428/102 |
| 5,254,383 A * | 10/1993 | Harpell et al. | 428/68 |
| 5,286,833 A | 2/1994 | Bubeck et al. | 528/183 |
| 5,296,185 A | 3/1994 | Chau et al. | 264/205 |
| 5,330,820 A | 7/1994 | Li et al. | 428/105 |
| 5,356,584 A | 10/1994 | Bubeck et al. | 264/205 |
| 5,471,906 A | 12/1995 | Bachner, Jr. et al. | 89/36.05 |
| 5,534,205 A | 7/1996 | Faley et al. | 264/103 |
| 5,552,208 A | 9/1996 | Lin et al. | 428/113 |
| 5,587,230 A | 12/1996 | Lin et al. | 428/245 |
| 5,668,344 A | 9/1997 | Bornstein | |
| 5,674,969 A | 10/1997 | Sikkema et al. | 528/183 |
| 5,677,029 A | 10/1997 | Prevorsek et al. | 428/113 |
| 5,702,657 A | 12/1997 | Yoshida et al. | 264/112 |
| 5,939,553 A | 8/1999 | Reichwein et al. | 546/250 |
| 5,945,537 A | 8/1999 | Sikkema | 546/307 |
| 6,040,050 A | 3/2000 | Kitagawa et al. | 428/364 |
| 6,040,478 A | 3/2000 | Sikkema et al. | 562/424 |
| 6,127,291 A * | 10/2000 | Coppage et al. | 442/135 |
| 6,219,842 B1 | 4/2001 | Bachner, Jr. | 2/2.5 |
| 6,248,676 B1 | 6/2001 | Dischler | 442/217 |
| 6,268,301 B1 | 7/2001 | Dalman et al. | 442/101 |
| 6,642,159 B1 | 11/2003 | Bhatnagar et al. | 442/134 |

FOREIGN PATENT DOCUMENTS

| | | |
|---|---|---|
| WO | WO9006389 | 6/1990 |
| WO | WO 0115892 A1 * | 3/2001 |

* cited by examiner

FIG. 1

FIG. 2

FRAGMENT AND STAB RESISTANT FLEXIBLE MATERIAL WITH REDUCED TRAUMA EFFECT

BACKGROUND OF THE INVENTION

1. Field of the Invention

This invention relates to composite materials based on high strength fibers which are flexible but provide protection against projectile fragments and sharp items, such as knives.

2. Description of the Related Art

Ballistic resistant products for vests and the like are known in the art. Many of these products are based on high tenacity fibers, such as extended chain polyethylene fibers. Body armor, such as bullet-resistant vests, may be formed from rigid composites and/or flexible composites.

Garments formed from rigid body armor provide good resistance to puncture by sharp objects, such as knife blades, but they are also very stiff and relatively bulky. As a result, in general rigid body armor garments (e.g., vests) are less comfortable to wear than flexible body armor garments. However, the latter may not provide adequate resistance to knife stabs, ice pick stabs and the like, as well as to projectile fragments.

Although flexible body armor, such as vests, formed from high tenacity fibers have been shown to be highly resistant to bullet penetration, at times the wearer suffers trauma resulting from the bullet impact. In such a case, the bullet, though stopped, causes trauma because the length of the bullet stopping path in soft armor is relatively short.

It would be desirable to provide a flexible composite material which has the desirable armor properties of rigid composites but is comfortable to wear. Such a composite material and body armor formed therefrom desirably would be resistant to bullets, projectile fragments and other ballistic particles, and would also be resistant to stabs by knives, ice picks and other sharp objects. In addition, such body armor would perform in a manner such as to reduce the trauma to the wearer caused by bullets or other ballistic objects. Desirably, such body armor would be comfortable to wear and not costly to manufacture.

SUMMARY OF THE INVENTION

In accordance with this invention, there is provided an impact resistant flexible composite, comprising:

(a) at least one fibrous layer, the fibrous layer comprising a network of high tenacity fibers, the fibrous layer being in a resin matrix;

(b) the at least one fibrous layer being consolidated in a specified pattern over a substantial portion of its surface area, the fibrous layer also having portions of its surface area that are unconsolidated, the unconsolidated areas being in contact with the consolidated areas, the unconsolidated areas forming hinges between the consolidated areas such that the composite is flexible, the composite being resistant to ballistic projectiles and sharp objects.

Further in accordance with this invention, an impact resistant flexible composite, comprising:

(a) a plurality of fibrous layers, the fibrous layers comprising a network of high tenacity fibers, the fibrous layers being in a resin matrix;

(b) the plurality of fibrous layers being consolidated in a pattern of interconnected triangles over a substantial portion of its surface area, the plurality of fibrous layers also having portions of its surface area that are unconsolidated, the unconsolidated areas being in the form of lines which contact with the consolidated areas, the unconsolidated areas forming hinges between the consolidated areas such that the composite is flexible, the composite being resistant to ballistic projectiles and sharp objects.

Also in accordance with this invention, there is provided flexible body armor which is resistant to ballistic projectiles and sharp objects, the body armor comprising at least one composite, the composite comprising:

a) at least one fibrous layer, the fibrous layer comprising a network of high tenacity fibers, the fibrous layer being in a resin matrix;

(b) the at least one fibrous layer being consolidated in a specified pattern over a substantial portion of its surface area, the fibrous layer also having portions of its surface area that are unconsolidated, the unconsolidated areas being in contact with the consolidated areas, the unconsolidated areas forming hinges between the consolidated areas such that the composite is flexible, the body armor being resistant to ballistic projectiles and sharp objects.

Further in accordance with this invention, there is provided flexible body armor which is resistant to ballistic projectiles and sharp objects, the body armor comprising a plurality of overlying composites, the composites comprising:

(a) a plurality of fibrous layers, the fibrous layers comprising a network of high tenacity fibers, the fibrous layers being in a resin matrix;

(b) the plurality of fibrous layers being consolidated in a pattern of interconnected triangles over a substantial portion of its surface area, the plurality of fibrous layers also having portions of its surface area that are unconsolidated, the unconsolidated areas being in the form of lines which are in contact with the consolidated areas, the unconsolidated areas forming hinges between the consolidated areas such that the composite is flexible, the body armor being resistant to ballistic projectiles and sharp objects.

Additionally, this invention provides a method of forming a flexible composite material that is resistant to ballistic projectiles and sharp objects, the method comprising:

(a) providing at least one fibrous layer comprising a network of high tenacity fibers, said fibrous layer being in a resin matrix;

(b) molding the at least one fibrous layer so that there is selective consolidation of the fibrous layer in a specified pattern, such that the molded fibrous layer has a substantial portion of its surface area consolidated in a specified pattern, and the molded fibrous layer has portions of its surface area that are unconsolidated, the unconsolidated areas being in the form of lines which contact with the consolidated areas, the unconsolidated areas forming hinges between the consolidated areas such that the composite is flexible, and the composite being resistant to ballistic projectiles and sharp objects.

Preferably, the areas of consolidation are in the form of geometric shapes, with an equilateral triangle being the preferred shape. The lines or strips between the consolidated geometric shapes form hinges, such that the rigid portions are flexible about the hinges. This results in an overall structure that is flexible, yet provides excellent ballistic protection.

The present invention provides a flexible composite material formed from high tenacity fibers which has areas that are consolidated so as to form rigid portions. The composite also has areas that are not consolidated and remain flexible. These areas are in contact with the rigid portions and form hinges such that the composite is flexible about the hinges. By combining the features of a rigid composite and a flexible composite in the same structure, the overall composite is flexible yet has the desirable ballistic resistant properties of a rigid structure. Thus, the composite of the invention is resistant to ballistic particles such as fragments, bullets and the like. The composite is also resistant to stabs from sharp objects such as knives, ice picks and the like. In addition, because the composite has a substantial portion of its surface area which is rigid, there is a reduction in trauma from bullets and the like to the wearer of vests which are formed from the composite material.

This invention thus provides for selective consolidation of multiple layers of high tenacity fibers in a pattern that leaves unconsolidated areas that form "hinges". A substantial portion of the composite is consolidated and has characteristics of rigid armor (good fragment, stab and trauma resistance). The hinges or strips of non-consolidated layers of the high tenacity fibers endow the material with flexibility sufficient for use in body armor such as bullet resistant vests.

BRIEF DESCRIPTION OF THE DRAWINGS

This invention will become more fully understood and further advantages will become apparent when reference is had to the following detailed description of the preferred embodiments of the invention and the accompanying drawings, in which.

DETAILED DESCRIPTION OF THE INVENTION

The present invention comprises a composite which is formed from at least one fibrous layer, and preferably from a plurality of fibrous layers. The fibrous layer or layers comprise a network of high tenacity fibers that are in a resin matrix. The composite is preferably formed from at least two layers of the high tenacity fibers.

For the purposes of the present invention, a fiber is an elongate body the length dimension of which is much greater that the transverse dimensions of width and thickness. Accordingly, the term fiber includes monofilament, multifilament, ribbon, strip, staple and other forms of chopped, cut or discontinuous fiber and the like having regular or irregular cross-section. The term "fiber" includes a plurality of any of the foregoing or a combination thereof. A yarn is a continuous strand comprised of many fibers or filaments.

The cross-sections of fibers useful herein may vary widely. They may be circular, flat or oblong in cross-section. They may also be of irregular or regular multi-lobal cross-section having one or more regular or irregular lobes projecting from the linear or longitudinal axis of the fibers. It is preferred that the fibers be of substantially circular, flat or oblong cross-section, most preferably the former.

As used herein, the term "high tenacity fibers" means fibers which have tenacities equal to or greater than about 7 g/d. Preferably, these fibers have initial tensile moduli of at least about 150 g/d and energies-to-break of at least about 8 J/g as measured by ASTM D2256. As used herein, the terms "initial tensile modulus", "tensile modulus" and "modulus" mean the modulus of elasticity as measured by ASTM 2256 for a yarn and by ASTM D638 for an elastomer or matrix material.

Preferably, the high tenacity fibers have tenacities equal to or greater than about 10 g/d, more preferably equal to or greater than about 16 g/d, even more preferably equal to or greater than about 22 g/d, and most preferably equal to or greater than about 28 g/d.

The network of fibers used in the composite of this invention may be in the form of woven, knitted or non-woven fabrics formed from high tenacity fibers. Preferably, at least 50% by weight of the fibers in the fabric are high tenacity fibers, more preferably at least about 75% by weight of the fibers in the fabric are high tenacity fibers, and most preferably substantially all of the fibers in the fabric are high tenacity fibers.

The yarns and fabrics of the invention may be comprised of one or more different high strength fibers. The yarns may be in essentially parallel alignment, or the yarns may be twisted, over-wrapped or entangled. The fabrics of the invention may be woven with yarns having different fibers in the warp and weft directions, or in other directions.

The yarns useful in the fibrous layers may be of any suitable denier, such as from about 50 denier to about 3000 denier. The selection is governed by considerations of ballistic effectiveness and cost. Finer yarns are more costly to manufacture and to weave, but can produce greater ballistic effectiveness per unit weight. The yarns are preferably from about 200 denier to about 3000 denier. More preferably, the yarns are from about 650 denier to about 1500 denier. Most preferably, the yarns are from about 800 denier to about 1300 denier.

High strength fibers useful in the yarns and fabrics of the invention include highly oriented high molecular weight polyolefin fibers, particularly high modulus polyethylene fibers and polypropylene fibers, aramid fibers, polybenzazole fibers such as polybenzoxazole (PBO) and polybenzothiazole (PBT), polyvinyl alcohol fibers, polyacrylonitrile fibers, liquid crystal copolyester fibers, glass fibers, carbon fibers or basalt or other mineral fibers, as well as rigid rod polymer fibers, and mixtures and blends thereof. Preferred high strength fibers useful in this invention include polyolefin fibers, aramid fibers and polybenzazole fibers, and mixtures and blends thereof. Most preferred are high molecular weight polyethylene fibers, aramid fibers and polybenzoxazole fibers, and blends and mixtures thereof.

U.S. Pat. No. 4,457,985 generally discusses such high molecular weight polyethylene and polypropylene fibers, and the disclosure of this patent is hereby incorporated by reference to the extent that it is not inconsistent herewith. In the case of polyethylene, suitable fibers are those of weight average molecular weight of at least about 150,000, preferably at least about one million and more preferably between about two million and about five million. Such high molecular weight polyethylene fibers may be spun in solution (see U.S. Pat. No. 4,137,394 and U.S. Pat. No. 4,356,138), or a filament spun from a solution to form a gel structure (see U.S. Pat. No. 4,413,110, German Off. No. 3,004, 699 and GB Patent No. 2051667), or the polyethylene fibers may be produced by a rolling and drawing process (see U.S. Pat. No. 5,702,657). As used herein, the term polyethylene means a predominantly linear polyethylene material that may contain minor amounts of chain branching or comonomers not exceeding 5 modifying units per 100 main chain carbon atoms, and that may also contain admixed therewith not more than about 50 wt % of one or more polymeric additives such as alkene-1-polymers, in particular low density polyethylene, polypropylene or polybutylene, copolymers containing mono-olefins as primary monomers, oxidized polyolefins, graft polyolefin copolymers and polyoxymethylenes, or low molecular weight additives such as antioxidants, lubricants, ultraviolet screening agents, colorants and the like which are commonly incorporated.

High tenacity polyethylene fibers (also referred to as extended chain or high molecular weight polyethylene fibers) are preferred and are sold under the trademark SPECTRA® by Honeywell International Inc. of Morristown, N.J., U.S.A Depending upon the formation technique, the draw ratio and temperatures, and other conditions, a variety of properties can be imparted to these fibers. The tenacity of the polyethylene fibers are at least about 7 g/d, preferably at least about 15 g/d, more preferably at least about 20 g/d, still more preferably at least about 25 g/d and most preferably at least about 30 g/d. Similarly, the initial tensile modulus of the fibers, as measured by an Instron tensile testing machine, is preferably at least about 300 g/d, more preferably at least about 500 g/d, still more preferably at least about 1,000 g/d and most preferably at least about 1,200 g/d. These highest values for initial tensile modulus and tenacity are generally obtainable only by employing solution grown or gel spinning processes. Many of the filaments have melting points higher than the melting point of the polymer from which they were formed. Thus, for example, high molecular weight polyethylene of about 150,000, about one million and about two million molecular weight generally have melting points in the bulk of 138° C. The highly oriented polyethylene filaments made of these materials have melting points of from about 7° C. to about 13° C. higher. Thus, a slight increase in melting point reflects the crystalline perfection and higher crystalline orientation of the filaments as compared to the bulk polymer.

Similarly, highly oriented high molecular weight polypropylene fibers of weight average molecular weight at least about 200,000, preferably at least about one million and more preferably at least about two million may be used. Such extended chain polypropylene may be formed into reasonably well oriented filaments by the techniques prescribed in the various references referred to above, and especially by the technique of U.S. Pat. No. 4,413,110. Since polypropylene is a much less crystalline material than polyethylene and contains pendant methyl groups, tenacity values achievable with polypropylene are generally substantially lower than the corresponding values for polyethylene. Accordingly, a suitable tenacity is preferably at least about 8 g/d, more preferably at least about 11 g/d. The initial tensile modulus for polypropylene is preferably at least about 160 g/d, more preferably at least about 200 g/d. The melting point of the polypropylene is generally raised several degrees by the orientation process, such that the polypropylene filament preferably has a main melting point of at least 168° C., more preferably at least 170° C. The particularly preferred ranges for the above described parameters can advantageously provide improved performance in the final article. Employing fibers having a weight average molecular weight of at least about 200,000 coupled with the preferred ranges for the above-described parameters (modulus and tenacity) can provide advantageously improved performance in the final article.

In the case of aramid fibers, suitable fibers formed from aromatic polyamides are described in U.S. Pat. No. 3,671, 542, which is incorporated herein by reference to the extent not inconsistent herewith. Preferred aramid fibers will have a tenacity of at least about 20 g/d, an initial tensile modulus of at least about 400 g/d and an energy-to-break at least about 8 J/g, and particularly preferred aramid fibers will have a tenacity of at least about 20 g/d and an energy-to-break of at least about 20 J/g. Most preferred aramid fibers will have a tenacity of at least about 23 g/d, a modulus of at least about 500 g/d and an energy-to-break of at least about 30 J/g. For example, poly(p-phenylene terephthalamide) filaments which have moderately high moduli and tenacity values are particularly useful in forming ballistic resistant composites. Examples are Twaron® T2000 from Teijin which has a denier of 1000. Other examples are Kevlar® 29 which has 500 g/d and 22 g/d as values of initial tensile modulus and tenacity, respectively, as well as Kevlar® 129 and KM2 which are available in 400, 640 and 840 deniers from du Pont. Aramid fibers from other manufacturers can also be used in this invention. Copolymers of poly(p-phenylene terephthalamide) may also be used, such as co-poly(p-phenylene terephthalamide 3,4' oxydiphenylene terephthalamide). Also useful in the practice of this invention are poly(m-phenylene isophthalamide) fibers sold by du Pont under the trade name Nomex®.

High molecular weight polyvinyl alcohol (PV—OH) fibers having high tensile modulus are described in U.S. Pat. No. 4,440,711 to Kwon et al., which is hereby incorporated by reference to the extent it is not inconsistent herewith. High molecular weight PV—OH fibers should have a weight average molecular weight of at least about 200,000. Particularly useful PV—OH fibers should have a modulus of at least about 300 g/d, a tenacity preferably at least about 10 g/d, more preferably at least about 14 g/d and most preferably at least about 17 g/d, and an energy to break of at least about 8 J/g. PV—OH fiber having such properties can be produced, for example, by the process disclosed in U.S. Pat. No. 4,599,267.

In the case of polyacrylonitrile (PAN), the PAN fiber should have a weight average molecular weight of at least about 400,000. Particularly useful PAN fiber should have a tenacity of preferably at least about 10 g/d and an energy to break of at least about 8 J/g. PAN fiber having a molecular weight of at least about 400,000, a tenacity of at least about 15 to 20 g/d and an energy to break of at least about 8 J/g is most useful; and such fibers are disclosed, for example, in U.S. Pat. No. 4,535,027.

Suitable liquid crystal copolyester fibers for the practice of this invention are disclosed, for example, in U.S. Pat. Nos. 3,975,487; 4,118,372 and 4,161,470.

Suitable polybenzazole fibers for the practice of this invention are disclosed, for example, in U.S. Pat. Nos. 5,286,833, 5,296,185, 5,356,584, 5,534,205 and 6,040,050. Polybenzazole fibers are available under the designation Zylon® fibers from Toyobo Co.

Rigid rod fibers are disclosed, for example, in U.S. Pat. Nos. 5,674,969, 5,939,553, 5,945,537 and 6,040,478. Such fibers are available under the designation M5® fibers from Magellan Systems International.

As mentioned above, the high strength fibers may be in the form of a woven, knitted or non-woven fabric. Preferably, the high strength fabric is in the form of a non-woven fabric, such as plies of unidirectionally oriented fibers, or fibers which are felted in a random orientation and are in a suitable resin matrix. Another preferred fabric material useful herein as the fibrous layer(s) are fabrics formed from unidirectionally oriented fibers, which typically have one layer of fibers which extend in one direction and a second layer of fibers which extend in a direction 90° from the first fibers. Where the individual plies are unidirectionally oriented fibers, the successive plies are preferably rotated relative to one another, for example at angles of 0°/90° or 0°/45°/90°/45°/0° or at other angles. Examples of these unidirectionally oriented non-woven fabrics are the following, which are available from Honeywell International Inc.: SPECTRA SHIELD® PCR (which is a non-woven fabric of SPECTRA® extended-chain polyethylene fiber tapes including a resin, which tapes are cross-plied at 0°/90° and are usually used in hard armor applications), SPECTRA SHIELD® PLUS PCR (which is a lighter version of SPECTRA SHIELD® PCR fabric), SPECTRA SHIELD® LCR (which is a non-woven fabric of SPECTRA® extended-chain polyethylene fiber tapes including a resin, which tapes are cross-plied at 0°/90°, sandwiched with a thermoplastic film, and are usually used in soft armor applications), SPECTRA SHIELD® PLUS LCR (which is a lighter version of SPECTRA SHIELD® LCR fabric), and GOLD FLEX® (which is an aramid shield material of four plies of unidirectional aramid fiber tapes including a resin, which are cross-plied at 0°/90°, 0°/90°, and sandwiched with a thermoplastic film).

One woven fabric that is useful in the present invention is a woven fabric formed from SPECTRA® polyethylene fibers. In one embodiment, the fabric preferably has between about 15 and about 55 ends per inch (about 5.9 to about 21.6 ends per cm) in both the warp and fill directions, and more preferably between about 17 and about 45 ends per inch (about 6.7 to about 17.7 ends per cm). The yarns are preferably each between about 200 and about 1200 denier. The result is a woven fabric weighing preferably between about 2 and about 15 ounces per square yard (about 67.8 to about 508.6 $g/m^2$), and more preferably between about 5 and about 11 ounces per square yard (about 169.5 to about 373.0 $g/m^2$). Examples of such fabrics are those designated as SPECTRA® fabric styles 902, 904, 952, 955 and 960. As those skilled in the art will appreciate, the fabric constructions described here are exemplary only and not intended to limit the invention thereto.

The resin matrix for the fiber plies may be formed from a wide variety of elastomeric materials having desired characteristics. In one embodiment, the elastomeric materials used in such matrix possess initial tensile modulus (modulus of elasticity) equal to or less than about 6,000 psi (41.4 MPa) as measured by ASTM D638. More preferably, the elastomer has initial tensile modulus equal to or less than about 2,400 psi (16.5 MPa). Most preferably, the elastomeric material has initial tensile modulus equal to or less than about 1,200 psi (8.23 MPa). These resinous materials are typically thermoplastic in nature.

Alternatively, the resin matrix may be selected to have a high tensile modulus when cured, as at least about $1 \times 10^6$ psi (6895 MPa). Examples of such materials are disclosed, for example, in U.S. Pat. No. 6,642,159, the disclosure of which is expressly incorporated herein by reference.

The proportion of the resin matrix material to fiber in the composite layers may vary widely depending upon the end use. The resin matrix material preferably forms about 1 to about 98 percent by weight, more preferably from about 5 to about 95 percent by weight, and most preferably from about 5 to about 40 percent by weight, of the total weight of the fibers and resin matrix.

A wide variety of elastomeric materials may be utilized as the resin matrix. For example, any of the following materials may be employed: polybutadiene, polyisoprene, natural rubber, ethylene-propylene copolymers, ethylene-propylene-diene terpolymers, polysulfide polymers, polyurethane elastomers, chlorosulfonated polyethylene, polychloroprene, plasticized polyvinylchloride using dioctyl phthalate or other plasticizers well known in the art, butadiene acrylonitrile elastomers, poly (isobutylene-co-isoprene), polyacrylates, polyesters, polyethers, fluoroelastomers, silicone elastomers, thermoplastic elastomers, and copolymers of ethylene. Examples of thermosetting resins include those which are soluble in carbon-carbon saturated solvents such as methyl ethyl ketone, acetone, ethanol, methanol, isopropyl alcohol, cyclohexane, ethyl acetone, and combinations thereof. Among the thermosetting resins are vinyl esters, styrene-butadiene block copolymers, diallyl phthalate, phenol formaldehyde, polyvinyl butyral and mixtures thereof, as disclosed in the aforementioned U.S. Pat. No. 6,642,159. Preferred thermosetting resins for polyethylene fiber fabrics include at least one vinyl ester, diallyl phthalate, and optionally a catalyst for curing the vinyl ester resin.

One preferred group of materials for polyethylene fiber fabrics are block copolymers of conjugated dienes and vinyl aromatic copolymers. Butadiene and isoprene are preferred conjugated diene elastomers. Styrene, vinyl toluene and t-butyl styrene are preferred conjugated aromatic monomers. Block copolymers incorporating polyisoprene may be hydrogenated to produce thermoplastic elastomers having saturated hydrocarbon elastomer segments. The polymers may be simple tri-block copolymers of the type $R-(BA)_x$ (x=3–150); wherein A is a block from a polyvinyl aromatic monomer and B is a block from a conjugated diene elastomer. A preferred resin matrix is an isoprene-styrene-isoprene block copolymer, such as Kraton® D1107 isoprene-styrene-isoprene block copolymer available from Kraton Polymer LLC.

In general, the fibrous layers of the invention are preferably formed by constructing a fiber network initially and then coating the network with the matrix composition. As used herein, the term "coating" is used in a broad sense to describe a fiber network wherein the individual fibers either have a continuous layer of the matrix composition surrounding the fibers or a discontinuous layer of the matrix composition on the surfaced of the fibers. In the former case, it can be said that the fibers are fully embedded in the matrix composition. The terms coating and impregnating are interchangeably used herein. The fiber networks can be constructed via a variety of methods. In the preferred case of unidirectionally aligned fiber networks, yarn bundles of the high tenacity filaments are supplied from a creel and led through guides and one or more spreader bars into a collimating comb prior to coating with the matrix material. The collimating comb aligns the filaments coplanarly and in a substantially unidirectional fashion.

The matrix resin composition is applied as a solution, dispersion or emulsion onto the fiber network layer, preferably a unidirectional fiber network. The matrix-coated fiber network is then dried. The solution, dispersion or emulsion of the matrix resin may be sprayed onto the filaments. Alternatively, the filament structure may be coated with the aqueous solution, dispersion or emulsion by dipping or by means of a roll coater or the like. After coating, the coated fibrous layer may then be passed through an oven for drying in which the coated fiber network layer (unitape) is subjected to sufficient heat to evaporate the water in the matrix composition. The coated fibrous network may then be placed on a carrier web, which can be a paper or a film substrate, or the fibers may initially be placed on a carrier web before coating with the matrix resin.

Preferably, two layers of a unitape of the high tenacity fibers are stacked together, with the fibers in one layer being oriented at an angle to the fibers in the adjacent layer. As mentioned previously, the most preferred composite structure is one wherein the fiber network of each layer is unidirectionally aligned and oriented so that the fiber directions in adjacent layers are in a 0°/90° orientation.

The fibers in each adjacent layer may be the same or different, although it is preferred that the fibers in each two adjacent layers of the composite be the same.

Typically several layers of the composite are employed in the body armor to provide the requisite ballistic resistance, and the individual layers may be formed from different fibers or be in a different configuration than an adjacent layer.

Preferably, a plurality of the fibrous layers (preferably in the form of the two layer composite as described above) are used to form the composite structure of this invention. A plurality of such layers are stacked together. The number of stacked composite layers may vary according to the intended application and desired properties. For example, the number of stacked layers may range from about 2 to about 40, more preferably from about 2 to about 20, and most preferably from about 3 to about 15.

The stacked plurality of layers are processed so as to form areas that are consolidated and areas that are unconsolidated. This can be done in a batch process or on a continuous basis. In a batch process, the stacked plurality of fibrous layers are placed in a press between two molds. At least one of the molds, and preferably both, are formed with a pattern that is the reverse of the desired pattern that will be formed in the stacked layers, under heat and pressure. It is possible that the patterns on the upper and lower molds of the press may be different, but preferably they are the same.

In a continuous process, the stack of fibrous layers may be conveyed into a pair of rollers, at least one of which has a surface which has a pattern that is the reverse of the pattern desired in the stack of fibrous layers. As with the batch process, preferably the surfaces of both rollers are provided with the desired pattern. Likewise, the desired pattern on both rollers is the same.

Whether the stack of fibrous layers is processed in a batch or continuous manner, it is subject to heat and pressure either in the press or through the pair of rollers. The heat and pressure are chosen depending upon the resin matrix and the fibers in the fibrous layers. Typically, the heat and pressure used are similar to that used in forming flat consolidated sheets of the same fibrous material with the same matrix resin. The thickness of the consolidated composite may vary widely, depending upon the desired use. For example, the composite may have a thickness (measured at its consolidated area) of from about 0.04 to about 0.5 inch (0.102 to 1.27 cm), more preferably from about 0.125 to about 0.4 inch (0.375 to 1.02 cm), and most preferably from about 0.15 to about 0.375 inch (0.381 to 0.953 cm). The non-consolidated crests areas protrude from the surface of the consolidated areas by a desired amount.

For example, with a plurality of fibrous layers formed from high tenacity polyethylene fibers, the stack of fibrous layers is subject to temperatures in the range of from about 100 to about 150° C., preferably from about 110 to about 140° C., and more preferably from about 120 to about 127° C., and pressures from about 100 to about 2000 psi (0.689 to 13.78 mPa), preferably from about 150 to about 1500 psi (1.034 to 10.34 mPa), and more preferably from about 200 to about 1000 psi (1.378 to 6.89 mPa). Molding times may range, for example, from about 0.5 to about 30 minutes, preferably from about 1 to about 25 minutes, and more preferably from about 1 to about 20 minutes.

Figure 1:
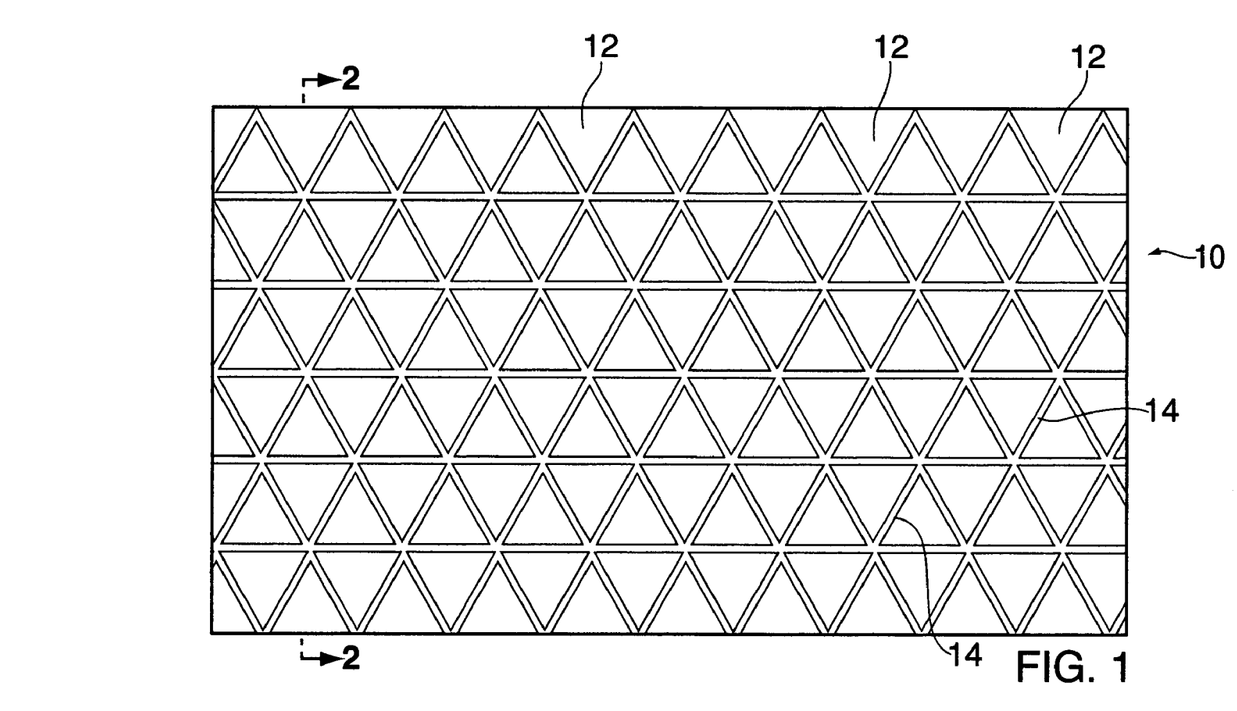
FIG. 1 is a plan view of the composite of this invention.

With reference to FIG. 1, there is shown flexible composite material 10 of the invention, which is formed from a stack of layers of high tenacity fibrous material. Flexible composite 10 is formed with a plurality of consolidated areas 12, which are separated by unconsolidated areas 14 shown in the form of straight lines. Areas 12 between lines 14 are shown as being in the form of adjacent equilateral triangles, with lines 14 abutting the edges of the equilateral triangles and separating them into their discrete shape.

Figure 2:
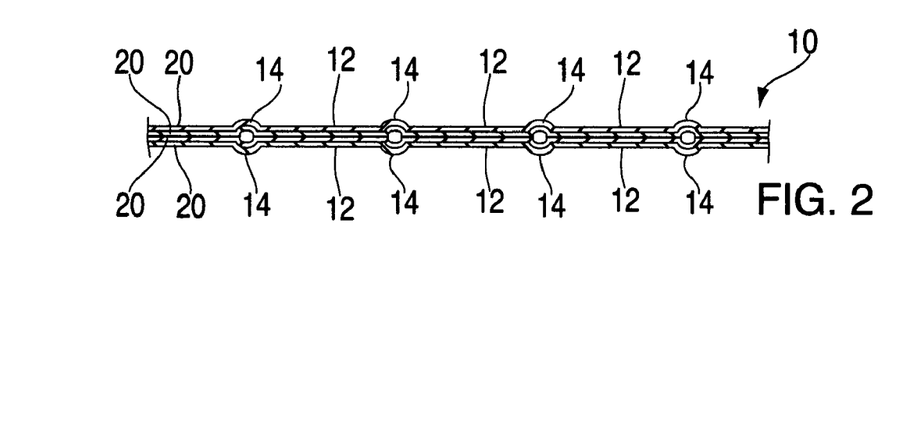
FIG. 2 is a cross-sectional view of the composite of this invention, taken along line 2-2 of FIG. 1.

FIG. 2 is a cross-sectional view, not to scale, of FIG. 1 and depicts the structure of the composite 10. As can be seen, composite 10 is formed from a plurality of fibrous layers 20 which have been stacked upon each other, with their major surfaces adjacent to one another. The areas 12 of the stack of fibrous layers has been consolidated (so as to be reduced in thickness) and the areas 14 of the stack of fibrous layers remains unconsolidated. Thus, areas or lines 14 extend outwardly from the major planes of the composite. That is, the upper and lower surfaces of the stack of fibrous layers are formed with the desired pattern. The major surfaces of the composite have a plurality of peaks and valleys, with the peaks being formed by the unconsolidated areas and the valleys by the consolidated areas. As can be seen in FIG. 2, the unconsolidated lines 14 preferably extend through the entire stack of layers. The unconsolidated lines 14 act as hinges between consolidated areas 12 such that areas 12 can flex about lines 14. As a result, the overall structure is flexible.

It should be pointed out that the pattern produced on the stack of fibrous layers may be any desired pattern, such as squares, rectangles, parallelograms, diamonds, hexagons, triangles, or other desired pattern, whether a geometric, non-geometric, regular or irregular pattern. The pattern may resemble quilting. Preferably, the pattern is a plurality of squares, diamonds, hexagons or triangles. Most preferably, the pattern is a plurality of equilateral triangles as shown in the drawings, as this provides maximum flexibility for a minimum non-consolidated area. In addition, the unconsolidated areas 14 between consolidated areas 12 need not be in the form of a straight line, but may be curved, have an irregular shape or be in the form of wider strips.

The size of each member of the desired pattern may vary. It has been found that with equilateral triangles as the pattern, good results are obtained when the triangles have sides from about 1 to about 3 inches (2.54 to 7.62 cm). If the sides are smaller, this will result in a lower percent of the consolidated area, and if the sides are larger, the composite may be awkward for use in body armor.

In forming a vest or other body armor, at least one layer of the composite material of this invention is used. Preferably, however there would be a plurality of composite layers employed in the body armor, in a manner similar to a typical vest which utilizes unconsolidated fibrous layers (without the consolidated areas). The composite material of this invention may be used with other composite materials of the same structure or with other flexible body armor, including non-woven, woven or knitted fabrics or shield structures.

A vest formed from a plurality of the composite material of the invention would typically be arranged such that the unconsolidated areas of one composite material were offset from the unconsolidated areas of the adjacent composite material. This is to provide increased protection from ballistic and stab threats, as the consolidated areas provide better protection than the non-consolidated areas. By offsetting the non-consolidated areas, there will be assured that any ballistic projectile or sharp object will be met by at least one consolidated area, and preferably several consolidated areas of different composites. Typically several layers of the composite material will be stacked together in a pillow or the like, with the layers being loosely arranged. The layers preferably are only tacked together so as to be able to shift with respect to each other. In some embodiments is may be desirable to stitch the layers together to avoid slippage of the individual plies with respect to each other. Alternatively, they could be laminated to one another.

It is preferred that the upper and lower surfaces of the stack of layers be provided with one or more plastic films so as to reduce the friction between composites when several are placed upon each other, which results in body armor that is more comfortable to wear. Any suitable plastic film may be employed, such as films made of polyolefins. Examples of such films are linear low density polyethylene (LLDPE) films, polyester films, nylon films, polycarbonate films and the like. These films may be of any desirable thickness. Typical thicknesses range from about 0.1 to about 1.2 mils (2.5 to 30 µm), more preferably from about 0.2 to about 1 mil (5 to 25 µm), and most preferably from about 0.3 to about 0.5 mils (7.5 to 12.5 µm).

A substantial portion of the surface area of composite 10 comprises the consolidated areas 12. As used herein, the term "substantial" portion means at least about 50% of the surface area. The percent of the surface area of composite 10 that comprises the consolidated areas 12 may vary widely. However, to achieve the desired protection against ballistic projectiles and sharp objects, it is preferred that the consolidated areas comprise most of the surface area of composite 10. For example, consolidated areas 12 may form from about 50 to about 98 percent of the entire surface area of composite 10, preferably from about 55 to about 95 percent, and more preferably from about 60 to about 90 percent, of the surface area of composite 10. In the most preferred embodiments, the consolidated areas 12 extend over about 90 to about 95 percent of the surface area of composite 10.

Various constructions are known for fiber-reinforced composites used in impact and ballistic resistant articles such as helmets, panels, and vests. These composites display varying degrees of resistance to penetration by high speed impact from projectiles such as bullets, shrapnel and fragments, and the like. For example, U.S. Pat. Nos. 6,268,301 B1; 6,248,676 B1, 6,219,842 B1; 5,677,029, 5,587,230; 5,552,208; 5,471,906; 5,330,820; 5,196,252; 5,190,802; 5,187,023; 5,185,195; 5,175,040; 5,167,876; 5,165,989; 5,124,195; 5,112,667; 5,061,545; 5,006,390; 4,953,234; 4,916,000; 4,883,700; 4,820,568; 4,748,064; 4,737,402; 4,737,401; 4,681,792; 4,650,710; 4,623,574; 4,613,535; 4,584,347; 4,563,392; 4,543,286; 4,501,856; 4,457,985; and 4,403,012; PCT Publication No. WO 91/12136; and a 1984 publication of E.I. DuPont De Nemours International S.A. entitled "Lightweight Composite Hard Armor Non Apparel Systems with T-963 3300 dtex DuPont Kevlar 29 Fibre", all describe ballistic resistant composites which include high strength fibers made from materials such as high molecular weight polyethylene, aramids and polybenzazoles. Such composites are said to be either flexible or rigid depending on the nature of their construction and the materials employed.

If the fabric of the fibrous layers is in the form of a woven fabric, it may be of any weave pattern, including plain weave, twill, satin, three dimensional woven fabrics, and any of their several variations. Plain weave fabrics are preferred and more preferred are plain weave fabrics having an equal warp and weft count.

It will be understood to those skilled in the art that it is not presently possible to specify a priori the best weave count for any particular combination of material, fiber denier and yarn denier. On the one hand, tighter weaves having the highest possible coverage make it more difficult for the projectile to find holes and to push yarns and fibers aside. On the other hand, high frequency of yarn crossovers restricts propagation of the ballistic event through the fabric and lessens the volume of fibers able to absorb energy from the projectile. The skilled artisan will readily find the best yarn count for each fiber material, yarn denier and filament denier by experimentation.

As mentioned above, the composites of this invention are flexible even though they have components that are rigid. One measure of whether a composite is flexible is determined as follows: a sample measuring 10×10 inches (25.4×25.4 cm) is fixed horizontally at a flat desk edge (with one edge of the sample being 2 inches (5.08 cm) from the desk edge), with the rest of the sample overhanging the edge. For samples with sets of grooves, one set is arranged parallel to the desk edge. The distance of the free edge to the fixed edge is measured. For solid molded composites, typically the free edge hangs about 0.25 inch (0.635 cm) below the fixed edge. For a sample to be considered "flexible", its free end should hang down a distance of at least 2 inches (5.08 cm). In one example, the composites of this invention are so flexible that their free end hangs down on the order of 7 inches (17.78 cm) or more below the fixed end.

The following non-limiting examples are presented to provide a more complete understanding of the invention. The specific techniques, conditions, materials, proportions and reported data set forth to illustrate the principles of the invention are exemplary and should not be construed as limiting the scope of the invention.

EXAMPLES

Example 1

A composite was formed from a structure which included layers of unidirectionally oriented extended-chain polyethylene fibers. The composite was formed from 37 layers of SPECTRA SHIELD® PCR, which is a non-woven fabric of two SPECTRA® extended-chain polyethylene fiber non-woven tapes including a resin, which tapes are cross-plied at 0°/90°. The layers of SPECTRA SHIELD® PCR were stacked together and films of linear low density polyethylene having a thickness of 0.35 mils (8.75 µm) were placed on the top and bottom of the stack. Samples of the multilayered structure measuring 12×12 inches (30.5×30.5 cm), having an a real density of 1.02 psf (5.00 kg/m²), were placed in a hydraulic press, the top and bottom molds of which (each measuring 15×15 inches (38.1×38.1 cm)) were formed with a design of equilateral triangles attached to each other, similar to that shown in FIG. 1. The mold was formed from aluminum plates, with grooves measuring 4 mm wide and 5 mm deep having been cut therein. The grooves were separated such that a pattern of raised equilateral triangles were formed, the sides of each having a length of 1 inch (2.54 cm). The plates were mirror images of each other and were indexed with two pins so that all triangles of the molds would match up when the grooved sides of the plates were brought face to face. The groove edges were rounded to avoid fiber damage during the pressing/consolidating operation. The stack of polyethylene fiber layers were heated in the press to a temperature of 240° F. (116° C.) without applying pressure, then pressure was applied at 500 psi (3.45 mPa) for 10 minutes and the composite was allowed to cool in the press.

During the molding operation, the layers were consolidated in the area of the equilateral areas, but the connecting areas between the triangles were not consolidated. The pattern of the composite was that of consolidated repeating equilateral triangles, each having 1 inch (2.54 cm) sides, and separated by raised unconsolidated portions (hinges) measuring 4 mm wide. The consolidated area comprised approximately 58 percent of the overall surface area of the composite. The resulting laminate structure had a weight of 1.01 pounds (461 grams) and an average thickness measured on the consolidated trough of 0.204 inch (5.182 mm).

The resultant composite was easy flexed along the non-consolidated crest areas and thus the entire structure was flexible.

The composite was tested for ballistic fragment protection per test method MIL-STD-662F and the fragments used conformed to MIL-P46593A These fragments were 17 grain, 22 caliber, FSP hardened fragment simulators. One measure of the protective power of a sample composite is expressed by citing the impacting velocity at which 50% of the projectiles are stopped. This velocity, expressed in units of feet per second, is designated the $V_{50}$.

Different velocities were measured at the crest (the unconsolidated areas which protrude from the surface) and at the trough (the areas of consolidated triangles). The results are shown in Table 1, below.

TABLE 1

| Velocity Crest, fps (mps) | Result Crest |
|---|---|
| 1714 (523) | Partial |
| 1751 (534) | Partial |
| 1971 (601) | Complete |
| 1979 (603) | Complete |
| 1993 (608) | Complete |

| Velocity Trough, fps (mps) | Result Trough |
|---|---|
| 1850 (564) | Partial |
| 1853 (565) | Partial |
| 1928 (588) | Partial |

Notes:
Velocity is the velocity of approaching fragment in feet per second, fps (meters per second, mps).
Partial means partial penetration of the fragment, or success in stopping the fragment.
Complete means complete penetration of the fragment, or failure in stopping the fragment.

Examples 2 and 3 (Comparative)

In Example 2, Example 1 was repeated with an equivalent number of loose (unconsolidated) PCR sheets. It was determined that the $V_{50}$ was 1675 fps (511 mps).

In Example 3, Example 1 was repeated with an equivalent number of consolidated SPECTRA SHIELD® PCR sheets. It was determined that that $V_{50}$ was 1815 fps (553 mps).

When comparing the results from Example 1 and Examples 2 and 3, it can be seen that the velocity in the crest areas was similar to the $V_{50}$ measurement for the unconsolidated PCR material, and that the velocity in the trough areas was similar to the $V_{50}$ measurement for the consolidated PCR sheets. The material of this invention thus has the excellent ballistic resistance of a rigid material but is flexible.

Example 4

Samples prepared in the manner of Example 1 are tested for knife stab and ice pick protection in accordance with the NIJ Stab Resistance of Personal Body Armor test standard NIJ-STD-0115.00.

The panels are found to pass both the ice pick and knife-blade stab resistance tests.

It can be seen that the present invention provides flexible composites which have the ballistic resistant properties of rigid materials. The composites and body armor formed therefrom are resistant to ballistic projectiles, as well as knife stabs and ice pick stabs. The composites of this invention provides ballistic resistance with reduced trauma to the wearer and are easy to manufacture.

Having thus described the invention in rather full detail, it will be understood that such detail need not be strictly adhered to but that further changes and modifications may suggest themselves to one skilled in the art, all falling within the scope of the invention as defined by the subjoined claims.

What is claimed is:

1. An impact resistant flexible composite, comprising:
   (a) at least one fabric layer formed from a woven, knitted or non-woven fabric, said fabric layer comprising high tenacity fibers, said fabric layer being coated with a resin forming a matrix surrounding said fibers;
   (b) said fabric layer having at least one major surface comprising a plurality of peaks and valleys, said fabric layer being consolidated in a specified pattern over a substantial portion of its surface area so as to form molded fabric areas of said high tenacity fibers in said resin matrix that are integral with said fabric layer and which define said valleys, said fabric layer also having portions of its surface area that are unconsolidated so as to form non-molded fabric areas of said high tenacity fibers in said resin matrix that also are integral with said fabric layer and which define said peaks, said unconsolidated fabric areas being in contact with said consolidated fabric areas, said unconsolidated fabric areas extending outwardly of said major surface, said unconsolidated fabric areas forming hinges between said consolidated fabric areas such that said consolidated fabric areas can flex about said unconsolidated fabric areas, said consolidated fabric areas being thinner than said unconsolidated fabric areas, wherein said molded areas are rigid and said non-molded areas are flexible, said composite being resistant to ballistic projectiles and sharp objects.

2. The composite of claim 1 wherein said fabric layer comprises a non-woven fabric comprising unidirectional high tenacity fibers in said resin matrix.

3. The composite of claim 2 comprising a plurality of said non-woven fabric layers, and wherein adjacent non-woven fabric layers are oriented to one another.

4. The composite of claim 3 wherein said adjacent non-woven fabric layers are oriented 0°/90° relative to one another.

5. The composite of claim 1 wherein said fabric layer comprises a woven fabric formed from said high tenacity fibers.

6. The composite of claim 1 including plastic films on outer surfaces of said at least one fabric layer.

7. The composite of claim 1 wherein said consolidated fabric areas are in the form of interconnected geometric shapes.

8. The composite of claim 7 wherein said geometric shapes are triangles.

9. The composite of claim 7 wherein said unconsolidated areas are defined by the area between said interconnected geometric shapes.

10. The composite of claim 8 wherein said geometric shapes are in the form of equilateral triangles, and said unconsolidated areas are defined by the lines that interconnect said geometric shapes.

11. The composite of claim 1 wherein said high tenacity fibers have a tenacity of at least about 30 grams per denier.

12. The composite of claim 1 wherein said high tenacity fibers are selected from the group consisting of high molecular weight polyethylene, high molecular weight polypropylene, aramid, polyvinyl alcohol, polyacrylonitrile, polybenzazole, polyester and rigid rod fibers and blends thereof.

13. The composite of claim 1 wherein said high tenacity fibers are selected from the group consisting of high molecular weight polyethylene, aramid and blends thereof.

14. The composite of claim 1 wherein said high tenacity fibers comprise high molecular weight polyethylene.

15. The composite of claim 1 wherein said resin matrix comprises a thermoplastic resin.

16. The composite of claim 1 wherein said consolidated areas comprise from about 50 to about 98 percent of the surface area of said fabric layer.

17. The composite of claim 1 wherein said consolidated areas comprise from about 55 to about 95 percent of the surface area of said fabric layer.

18. The composite of claim 1 comprising a plurality of said fabric layers.

19. The composite of claim 18 wherein said consolidated areas extend through the entire plurality of said fabric layers.

20. The composite of claim 1 wherein said fabric layer comprises a non-woven fabric formed from said high tenacity fibers.

21. The composite of claim 1 further comprising at least one plastic film.

22. The composite of claim 1 wherein said unconsolidated areas are defined by lines created by edges of said consolidated areas and extend between said consolidated areas.

23. The composite of claim 1 wherein said fabric layer consists of said high tenacity fibers coated with said resin matrix.

24. An impact resistant flexible composite comprising a plurality of fabric layers that are stacked together,
(a) said fabric layers being formed from at least two plies of non-woven unidirectionally oriented high tenacity fibers layers, said unidirectionally oriented fibers being coated with a resin forming a matrix surrounding said fibers, wherein successive high tenacity fiber layers are rotated relative to one another;
(b) said plurality of stacked fabric layers having at least one major surface comprising a plurality of peaks and valleys, said plurality of fabric layers being consolidated in a specified pattern over a substantial portion of its surface area so as to form molded fabric areas of said high tenacity fibers in said resin matrix that are integral with said fabric layers and which define said valleys, said plurality of fabric layers also having portions of its surface area that are unconsolidated so as to form non-molded fabric areas of said high tenacity fibers in said resin matrix that also are integral with said fabric layers and which define said peaks, said unconsolidated fabric areas being in contact with said consolidated fabric areas, said unconsolidated fabric areas extending outwardly of said major surface, said unconsolidated fabric areas forming hinges between said consolidated fabric areas such that said consolidated fabric areas can flex about said unconsolidated fabric areas, said consolidated fabric areas being thinner than said unconsolidated fabric areas, wherein said molded areas are rigid and said non-molded areas are flexible, and said composite being resistant to ballistic projectiles and sharp objects.

25. The composite of claim 24 wherein said specified pattern comprises interconnected triangles.

26. The composite of claim 25 wherein said triangles are equilateral triangles.

27. The composite of claim 24 wherein said high tenacity fibers are selected from the group consisting of high molecular weight polyethylene, aramid and blends thereof.

28. The composite of claim 24 wherein said high tenacity fibers comprise high molecular weight polyethylene fibers.

29. The composite of claim 28 wherein said specified pattern comprises equilateral triangles having sides of from about 1 to about 3 inches (2.54 to 7.62 cm).

30. The composite of claim 29 wherein composite further comprises at least one plastic film.

31. The composite of claim 1 wherein said fabric layers consist of said high tenacity fibers coated with said resin matrix.

32. Flexible body armor formed from the composite of claim 1.

33. Flexible body armor formed from the composite of claim 24.

34. The body armor of claim 33 wherein at least two adjacent composites are arranged iii overlying fashion such that said unconsolidated areas of one composite are offset from said unconsolidated areas of the other composite.

35. Flexible body armor formed from a plurality of said stacked fabric layers of claim 28.

* * * * *